(12) United States Patent
Jin et al.

(10) Patent No.: US 7,940,713 B2
(45) Date of Patent: May 10, 2011

(54) APPARATUS AND METHOD FOR TRAFFIC PERFORMANCE IMPROVEMENT AND TRAFFIC SECURITY IN INTERACTIVE SATELLITE COMMUNICATION SYSTEM

(75) Inventors: Gwang-Ja Jin, Daejon (KR); Min-Su Shin, Daejon (KR); Nam-Kyung Lee, Daejon (KR); Deock-Gil Oh, Daejon (KR); Ho-Jin Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 686 days.

(21) Appl. No.: 11/635,295

(22) Filed: Dec. 7, 2006

(65) Prior Publication Data
US 2007/0133528 A1 Jun. 14, 2007

(30) Foreign Application Priority Data

Dec. 8, 2005 (KR) .................. 10-2005-0120159
Oct. 31, 2006 (KR) .................. 10-2006-0106523

(51) Int. Cl.
*H04L 12/56* (2006.01)
(52) U.S. Cl. .............. 370/316; 370/389; 370/395.21; 370/428; 455/452.2
(58) Field of Classification Search .......... 370/316, 370/389, 428, 395.21; 455/452.2
See application file for complete search history.

(56) References Cited

U.S. PATENT DOCUMENTS

| | | | | |
|---|---|---|---|---|
| 6,988,133 B1* | 1/2006 | Zavalkovsky et al. | ........ | 709/223 |
| 7,006,480 B2* | 2/2006 | Border et al. | .............. | 370/338 |
| 7,068,676 B1* | 6/2006 | Sugaya et al. | ................ | 370/445 |
| 7,127,250 B2* | 10/2006 | Gallagher et al. | ............ | 455/436 |
| 7,275,093 B1* | 9/2007 | Freed et al. | .................... | 709/223 |
| 7,360,083 B1* | 4/2008 | Ragireddy et al. | ............ | 713/160 |
| 7,450,585 B2* | 11/2008 | Dispensa | ...................... | 370/392 |
| 2001/0032265 A1* | 10/2001 | Tanaka | ......................... | 709/227 |
| 2002/0041590 A1* | 4/2002 | Donovan | ..................... | 370/352 |

(Continued)

FOREIGN PATENT DOCUMENTS

KR 1020040026315 3/2004

OTHER PUBLICATIONS

Ishac et al. "On the Performance of TCP Spoofing in Satellite Networks," appears in Military Communications Conference, 2001 (MILCOM 2001). Communications for Network-Centric Operations: Creating the Information Force. IEEE Publication Date: 2001.*

(Continued)

*Primary Examiner* — Jinsong Hu
*Assistant Examiner* — Qun Shen
(74) *Attorney, Agent, or Firm* — Ladas & Parry LLP

(57) ABSTRACT

There are provided an apparatus and method for traffic performance improvement and traffic security in an interactive satellite communication system. The method for traffic performance improvement of an interactive satellite communication system includes the steps of: a) storing an Internet protocol (IP) packet that is received from a user terminal connected to a satellite mobile terminal of the interactive satellite communication system and is to be transmitted to a central station through a satellite; b) transmitting acknowledgement for the stored IP packet to the user terminal by acting for the central station, before the stored IP packet is transmitted to the central station; and c) transmitting the stored IP packet through the satellite to the central station, and retransmitting an unacknowledged IP packet according to a retransmission request of the central station.

6 Claims, 4 Drawing Sheets

U.S. PATENT DOCUMENTS

| | | | |
|---|---|---|---|
| 2002/0055998 A1* | 5/2002 | Riddle et al. | 709/224 |
| 2002/0120749 A1* | 8/2002 | Widegren et al. | 709/227 |
| 2003/0123481 A1* | 7/2003 | Neale et al. | 370/466 |
| 2003/0147403 A1* | 8/2003 | Border et al. | 370/395.53 |
| 2003/0177395 A1* | 9/2003 | Pardee et al. | 713/201 |
| 2003/0204599 A1* | 10/2003 | Trossen et al. | 709/227 |
| 2003/0219022 A1* | 11/2003 | Dillon et al. | 370/395.52 |
| 2004/0264368 A1* | 12/2004 | Heiskari et al. | 370/229 |
| 2005/0058131 A1* | 3/2005 | Samuels et al. | 370/389 |
| 2006/0002333 A1* | 1/2006 | Skog et al. | 370/328 |
| 2006/0259602 A1* | 11/2006 | Stewart et al. | 709/223 |
| 2006/0262783 A1* | 11/2006 | Nedeltchev | 370/389 |
| 2007/0050842 A1* | 3/2007 | Smith et al. | 726/12 |
| 2007/0118881 A1* | 5/2007 | Mitchell et al. | 726/4 |
| 2007/0150936 A1* | 6/2007 | Maes | 726/1 |
| 2007/0226775 A1* | 9/2007 | Andreasen et al. | 726/1 |
| 2008/0069102 A1* | 3/2008 | Koehler et al. | 370/392 |
| 2008/0069111 A1* | 3/2008 | Sutton | 370/395.5 |
| 2008/0127327 A1* | 5/2008 | Carrasco | 726/15 |

OTHER PUBLICATIONS

Notice of Korean Patent Grant dated Dec. 14, 2007 for the corresponding application KR10-2006-0106523.

* cited by examiner

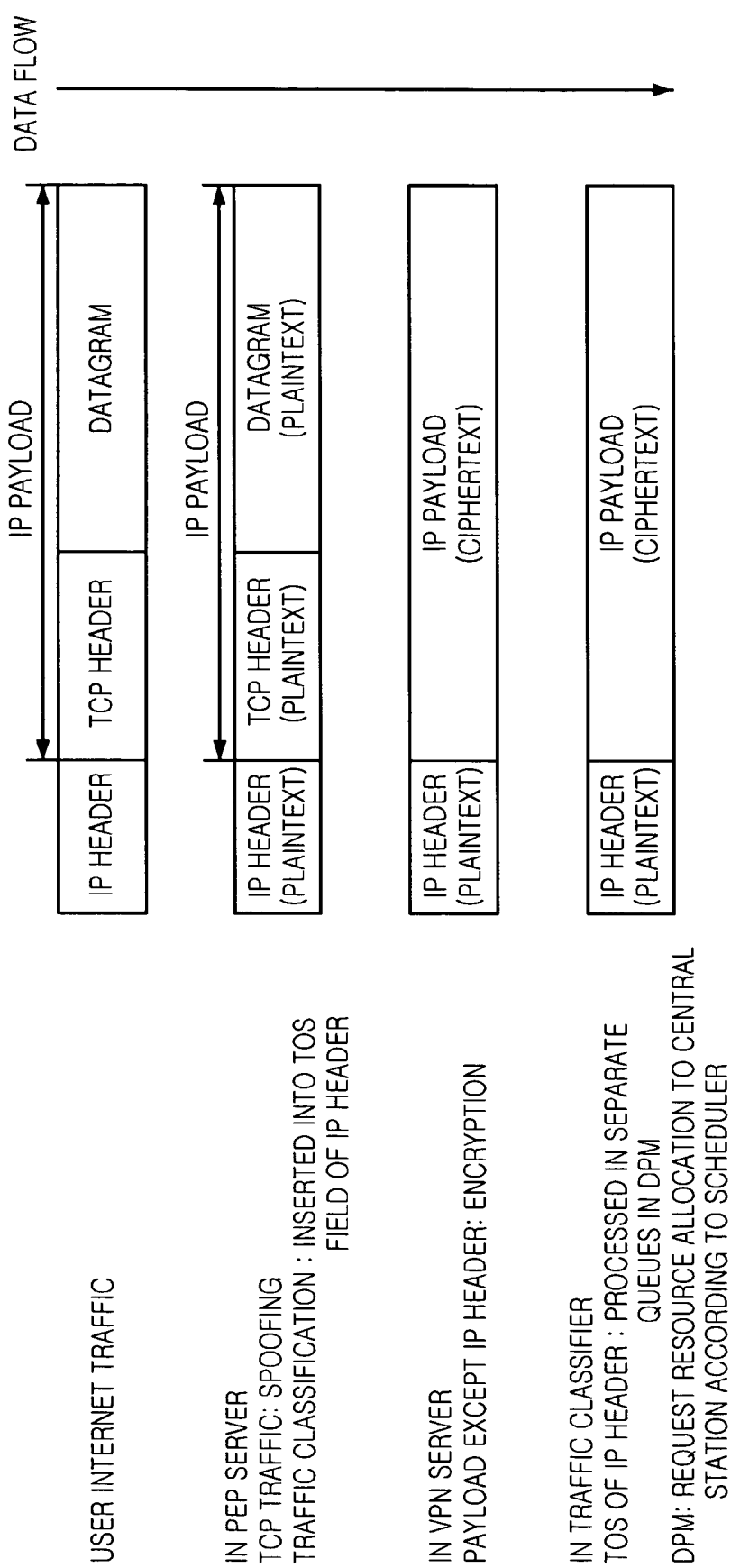

US 7,940,713 B2

APPARATUS AND METHOD FOR TRAFFIC PERFORMANCE IMPROVEMENT AND TRAFFIC SECURITY IN INTERACTIVE SATELLITE COMMUNICATION SYSTEM

FIELD OF THE INVENTION

The present invention relates to an apparatus and method for traffic performance improvement and traffic security in an interactive satellite communication system; and, more particularly, to an apparatus and method for traffic performance improvement and traffic security in an interactive satellite communication system, in which a process of transmitting/retransmitting an IP packet to be transmitted from a user terminal or a web server of an external network, which is connected to the interactive satellite communication system, through a satellite to a central station or a satellite mobile terminal is performed by acting for the web server of the external network or the user terminal, and a type of traffic is previously inserted into an IP header before an IP packet is encrypted in the satellite mobile terminal, thereby improving the traffic performance in consideration of a quality of service (QoS) and making it possible to apply a security scheme.

DESCRIPTION OF RELATED ART

A conventional interactive satellite communication system does not use a quality of service (QoS) support technique, a technique for transmission control protocol (TCP) traffic performance improvement, an encryption technique for a virtual private network (VPN), and so on. Even though these techniques are used, they are applied independently. Therefore, there is a demand for an integrated system using correlated techniques in the interactive satellite communication system. Problems of the integrated system will now be described.

When the QoS support technique, the technique for the traffic performance improvement, and the encryption technique for the VPN are simultaneously applied to the integrated interactive satellite communication system, an encrypted TCP header may not be read. Thus, traffic having priorities may not be classified or a spoofing acknowledgment (ACK) may not be processed.

For QoS, a satellite mobile terminal (SMT) analyzes TCP headers according to types of service and classifies the traffic received from users into Voice of Internet Protocol (VOIP) traffic, web business page traffic, game and moving picture traffic, and other traffic according to the analysis result.

On the contrary, when Internet Protocol security protocol (IPsec) is applied for the VPN, an IP payload containing a TCP header is encrypted in a third layer of an Open Systems Interconnection (OSI) 7 layer model, that is, a network layer. Therefore, the SMT has difficulty in classifying traffic because it cannot read an encrypted TCP header located in front of the IP payload.

Like in the QoS, a performance enhancement proxy (PEP) server for TCP performance enhancement analyzes TCP header together with IP header and processes a spoofing ACK for TCP traffic. Because IP packet is encrypted based on IPsec, the SMT has difficulty in reading TCP header.

When the PEP server and a traffic classifier for QoS are implemented in the same server, the VPN server using the IPsec may be located in a front end or a rear end of the traffic classifier and the PEP server. If the VPN server is located in the front end of the traffic classifier and the PEP server, the traffic classifier and the PEP server cannot perform their functions because of the data encryption.

On the contrary, if the VPN server is located in the rear end of the traffic classifier and the PEP server, an SMT's data processing module (DPM) that must perform a resource allocation to the central station according to an amount of IP data classified by the traffic classifier and stored in the respective queues is processed at a kernel of an operating system, e.g., Linux. Therefore, the traffic is transferred through a link layer in an Asynchronous Transfer Mode (ATM) cell or Moving Picture Experts Group 2 transport stream (MPEG2-TS) form without transferring to 3-layer or higher. However, because the IPsec of the VPN server is provided at the 3-layer, it cannot be applied.

SUMMARY OF THE INVENTION

It is, therefore, an object of the present invention to provide an apparatus and method for traffic performance improvement and traffic security in an interactive satellite communication system, in which a process of transmitting/retransmitting an IP packet to be transmitted from a user terminal or a web server of an external network, which is connected to the interactive satellite communication system, through a satellite to a central station or a satellite mobile terminal is performed by acting for the web server of the external network or the user terminal, and a type of traffic is previously inserted into an IP header before an IP packet is encrypted in the satellite mobile terminal, thereby improving the traffic performance in consideration of a quality of service (QoS) or applying a security scheme.

In accordance with an aspect of the present invention, there is provided a method for traffic performance improvement of an interactive satellite communication system, including the steps of: a) storing an Internet protocol (IP) packet that is received from a user terminal connected to a satellite mobile terminal of the interactive satellite communication system and is to be transmitted to a central station through a satellite; b) transmitting acknowledgement for the stored IP packet to the user terminal by acting for the central station, before the stored IP packet is transmitted to the central station; and c) transmitting the stored IP packet through the satellite to the central station, and retransmitting an unacknowledged IP packet according to a retransmission request of the central station.

In accordance with another aspect of the present invention, there is provided a traffic security method considering a quality of service (QoS) in an interactive satellite communication system, including the steps of: a) storing an IP packet that is received from a user terminal and is to be transmitted through a satellite to a central station, the user terminal being connected to a satellite mobile terminal of the interactive satellite communication system; b) inserting traffic type information, which is previously stored in a TCP header, into an IP header of the stored IP packet before the stored IP packet is encrypted; c) encrypting an IP payload except the IP header of the stored IP packet; d) classifying the encrypted IP packet according to the traffic type information; and e) requesting a resource allocation of a return link with respect to the classified IP packet to the central station according to a traffic type based priority.

In accordance with a further another aspect of the present invention, there is provided a method for traffic performance improvement in an interactive satellite communication system, including the steps of: a) storing an Internet protocol (IP) packet that is received from a web server of an external network connected to a central station of the interactive satellite communication and is to be transmitted to a satellite mobile terminal (SMT) through a satellite; b) transmitting acknowledgement for the stored IP packet to the web server of the external network by acting for the satellite mobile terminal, before the stored IP packet is transmitted to the satellite mobile terminal; and c) transmitting the stored IP packet through the satellite to the satellite mobile terminal, and retransmitting an unacknowledged IP packet according to a retransmission request of the satellite mobile terminal.

In accordance with a still further aspect of the present invention, there is provided an apparatus for traffic performance improvement and traffic security considering a quality of service (QoS) in a satellite mobile terminal of an interactive satellite communication system, including: a performance enhancement proxy (PEP) server for storing an IP packet received from a user terminal, transmitting acknowledgement for the stored IP packet to the user terminal by acting for a central station, retransmitting an unacknowledged IP packet according to retransmission request of the central station, and inserting a traffic type information, which is previously stored in a TCP header, into an IP header of the stored IP packet before the stored IP packet is encrypted; a virtual private network (VPN) server for encrypting an IP payload except the IP header of the IP packet received from the performance enhancement proxy server; a traffic classifier for classifying the encrypted IP packet according to the traffic type information; and a data transmit/receive (TX/RX) module for requesting a resource allocation of a return link with respect to the classified IP packet to the central station.

In accordance with a yet further aspect of the present invention, there is provided an apparatus for traffic performance improvement and traffic security considering a quality of service (QoS) in a central station of an interactive satellite communication system, including: a performance enhancement proxy (PEP) server for storing an IP packet received from a web server of an external network, transmitting acknowledgement for the stored IP packet to the web server of the external network by acting for a satellite mobile terminal, retransmitting an unacknowledged IP packet according to retransmission request of the satellite mobile terminal; a virtual private network (VPN) server for encrypting an IP payload except the IP header of the IP packet received from the performance enhancement proxy server; and a network resource management module for allocating a network resource considering a priority of a traffic type according to a return link resource request of the satellite mobile terminal.

The QoS support technique transfers data from the SMT to the central station according to services. The data are classified into VoIP traffic, business web page traffic to which the VPN is applied, game and moving picture traffic, and other traffic. The VoIP traffic providing voice is processed as the highest priority and then the business web traffic, the game or moving picture traffic, and other traffic are processed in this order. Therefore, when the return link resource is allocated in the central station, the traffic having the highest priority is first processed according to the above processing criterion.

The encryption technique for the VPN applies the IPsec to the network layer, i.e., the third layer of the OSI 7 layer model, in order for the VPN configuration. The encryption technique maintains the IP traffic security by encrypting the payload of the IP header. In order to encrypt the data transmitted through the wireless link of the satellite communication, a forward link transmitted through the central station to the SMT is encrypted in the central station and the encrypted data is decoded in the SMT. On the contrary, the data of the SMT is encrypted in the SMT and the encrypted data is decoded in the central station. Consequently, it can be available in the interactive satellite communication system.

In addition, the technique for traffic performance improvement includes a geostationary orbit satellite having a round trip time of 500 ms, and a technique for preventing a TCP transmission performance due to a congestion control at a bit error rate (BER) higher than a cable network. Because the data rate in the normal state of the TCP is inversely proportional to the RTT and packet loss rate, the performance is degraded by the excessive congestion control during the TCP traffic transmission. To solve the performance degradation, a PEP server is installed between the cable network and the satellite network. The PEP server stores data packet and performs the retransmission to the receiving side when the retransmission is necessary due to the loss of data link, and generates a spoofing ACK so that the transmitting side cannot perform the congestion control. That is, the congestion control preventing process generates and transmits the spoofing ACK. Therefore, the RTT recognized at the transmitting side is reduced to the RTT of the cable link. Consequently, the TCP performance restriction factor due to the RTT or BER can be removed.

BRIEF DESCRIPTION OF THE DRAWINGS

The above and other objects and features of the present invention will become apparent from the following description of the preferred embodiments given in conjunction with the accompanying drawings, in which:

FIG. 4 is a diagram illustrating a traffic security method considering QoS in an SMT in accordance with an embodiment of the present invention.

DETAILED DESCRIPTION OF THE INVENTION

Other objects and aspects of the invention will become apparent from the following description of the embodiments with reference to the accompanying drawings, which is set forth hereinafter.

Figure 1:
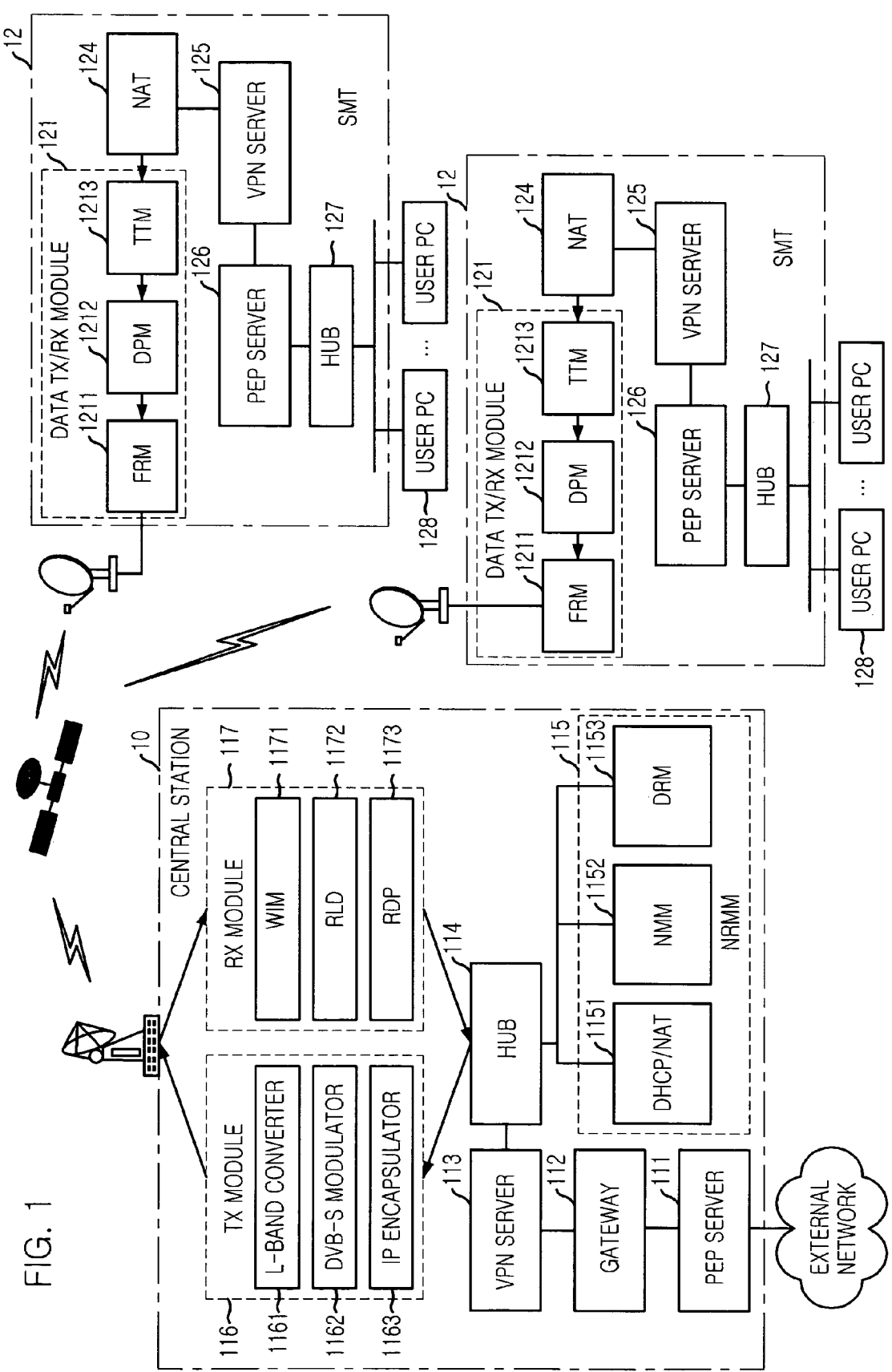
FIG. 1 is a block diagram of an interactive satellite communication system for traffic performance improvement and traffic security in accordance with an embodiment of the present invention.

FIG. 1 is a block diagram of an interactive satellite communication system for traffic performance improvement and traffic security in accordance with an embodiment of the present invention. The interactive satellite communication system can be used as an extended network from a terrestrial external network.

Referring to FIG. 1, the interactive satellite communication system includes a central station 10 and satellite mobile terminals (SMTs) 12. The central station 10 and the SMTs 12 exchange IP packets through a satellite network. The SMTs 12 provide IP packets received from the central station 10 to user terminals or user PCs 128.

The central station 10 includes a performance enhancement proxy (PEP) server 111, a gateway 112, a virtual private network (VPN) server 113, a hub 114, a network resource management module (NRMM) 115, a transmitter (TX) module 116, and a receiver (RX) module 117. The NRMM 115 includes a dynamic host configuration protocol/network address translator (DHCP/NAT) 1151, a network management module (NMM) 1152, and a dynamic resource module (DRM) 1153. The TX module 116 includes an L-band converter 1161, a DVB-S modulator 1162, and an IP encapsulator 1163. The RX module 117 includes a return link IF module (WIM) 1171, a return link demodulator (RLD) 1172, and an RX data processor (RDP) 1173.

The respective elements will be described below in detail.

The PEP server 111 stores IP packets received from a web server of an external network. The PEP server 111 transmits a spoofing ACK to the web server of the external network or retransmits the stored IP packets according to a retransmission request of the SMT when a transmitted link is lost. The PEP server 111 is located between a cable network and a satellite network to perform a retransmission to a receiving side, and prevents a performance degradation of TCP traffic due to a long round trip time (RTT) of the satellite network. The PEP server 111 passes a user datagram protocol (UDP).

The gateway 112 routes the IP packets received from the PEP server 111.

The VPN server 113 encrypts the IP payload but not the IP header of the IP packet stored in the PEP server 111 by using the IPsec. This aims to maintain the traffic security by applying the IPsec to the network layer, i.e., the third layer of the OSI 7 layer model, in order for the VPN configuration.

The VPN server 113 transmits the encrypted IP packet to the TX module 116. In order for data protection of satellite periods, the VPN server 113 is located at a position where the analysis of the IP header and the TCP header is completed.

The hub 114 connects the VPN server 113 to the TX module 116 and transmits IP packet.

The TX module 116 including the L-band converter 1161, the DVB-S modulator 1162, and the IP encapsulator 1163 transmits the IP packet encrypted by the VPN server 113 to the SMT through the satellite network. The RX module 117 receives an IP packet from the SMT through the WIM 1171, the RLD 1172, and the RDP 1173.

The NRMM 115 performs a network management function, such as dynamic host configuration and network address translation. Specifically, the DRM 1153 allocates return link resources differently according to a resource allocation request of the SMT in each IP traffic. The DRM 1153 allocates the resources according to the resource allocation request in each IP traffic in order from higher priority to lower priority. That is, the VoIP traffic having the highest priority is processed and then the web business traffic, the game or moving picture traffic, and other traffic are processed.

The SMT 12 includes a data TX/RX module 121, a network address translation (NAT) 124, a VPN server 125, a PEP server 126, and a hub 127. The data TX/RX module 121 includes a forward RX module (FRM) or demodulator & decoder for forward link 1211, a data processing module (DPM) 1212, and a TDMA TX module (TTM) or modulator & encoder for return link 1213. The respective elements will now be described in detail.

The PEP server 126 stores an IP packet among Internet data transmitted from the user PC 128 through the hub 127 and inserts a type of traffic to an IP header of the stored IP packet, based on the services. This process aims to allow the DPM 1212 to request the different resource allocation with respect to the service traffic in order to provide a QoS. The type of the traffic is inserted into a TOS field of the IP header, which is a plaintext. The TOS field is an 8-bit signal value of an IP datagram header indicating or identifying the priority of the individual packets. The priority of the packet is determined using the TOS field and another queue is applied.

The PEP server 126 analyzes the IP header and the TCP header and transmits a spoofing ACK to the user PC 128 or retransmits the stored IP packet according to a retransmission request of the central station. The PEP server 126 transmits to the VPN server 125 the IP packet in which the type of the traffic is inserted into the IP header.

The VPN server 125 encrypts the IP packet received from the PEP server 126 by using the IPsec.

The data TX/RX module 121 transmits/receives the IP packet through the satellite network.

The VPN server 125 decodes the IP packet received by the data TX/RX module 121. The VPN server 113 of the central station receives the IP header (plaintext) and the IP payload (ciphertext) and transforms the IP payload encrypted by the VPN server 113 into a plaintext and then transmits it to the user PC 128.

The VPN server 125 is used for data protection of a satellite period and is located at a position where the analysis of the IP header and the TCP header is completed.

The traffic classifier (21 FIG. 2) analyzes the TOS field of the IP header contained in the IP packet encrypted by the VPN server 125 and classifies the traffic according to the traffic priority. The traffic classifier classifies the traffic into VOIP traffic, web business traffic, game or moving picture traffic, and other traffic and manages the classified traffic in the separate queues. This process aims to allow the DPM 1212 to request different resources according to size of the queue separately classified based on the IP traffic.

Figure 2:
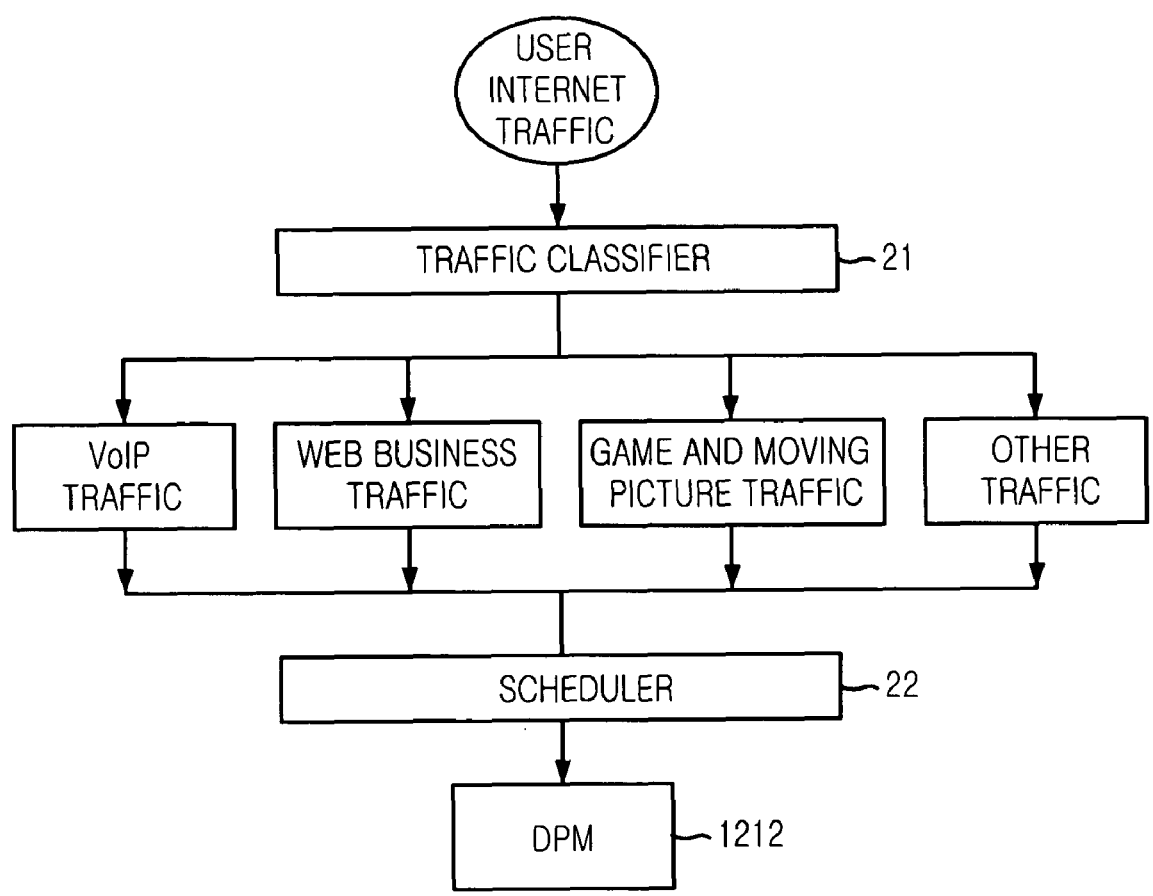
FIG. 2 is a block diagram illustrating a traffic classification method based on traffic priority in accordance with an embodiment of the present invention.

The DPM 1212 requests the resource of the return link channel to the central station 10 according to the classified traffic priority, i.e., the priority of a scheduler (22 in FIG. 2). For example, the priority of the scheduler is determined according to an amount of IP data stored in the respective queues.

The VPN server 125 transforms the plaintext of the IP payload, not the IP header, into the ciphertext, and transmits the ciphertext to the DPM 1212. The DPM 1212 can analyze only the IP header that is the plaintext. The DPM 1212 classifies the traffic into the VOIP traffic, the web business traffic, game or moving picture traffic, and other traffic according to the TOS field of the IP header and manages the classified traffic in the separate queues. The DPM 1212 requests the resources for the return link channels to the central station 10 according to the scheduler determined by an operator's policy.

For example, when the IP packet is the VOIP traffic, the DPM 1212 classifies the IP packet as the traffic having the highest priority and requests the resource allocation in which a constant data rate is secured, and requests the resource allocation in sequence according to the respective priorities.

FIG. 2 is a block diagram illustrating a traffic classification method based on a traffic priority in accordance with an embodiment of the present invention.

The traffic classifier 21 classifies the traffic according to the type of service in the SMT 12 in order to provide the QoS, and the scheduler 22 schedules the classified traffic in different queues. That is, the traffic classifier 21 classifies the traffic into VOIP traffic, web business traffic, game or moving picture traffic, and other traffic according to the services and buffers the classified traffic in the corresponding queues. Then, the traffic classifier 21 drives the scheduler 22 according to the user's request, such that the DPM 1212 request the resource allocation to the DRM 1153 according to the traffic.

Figure 3:
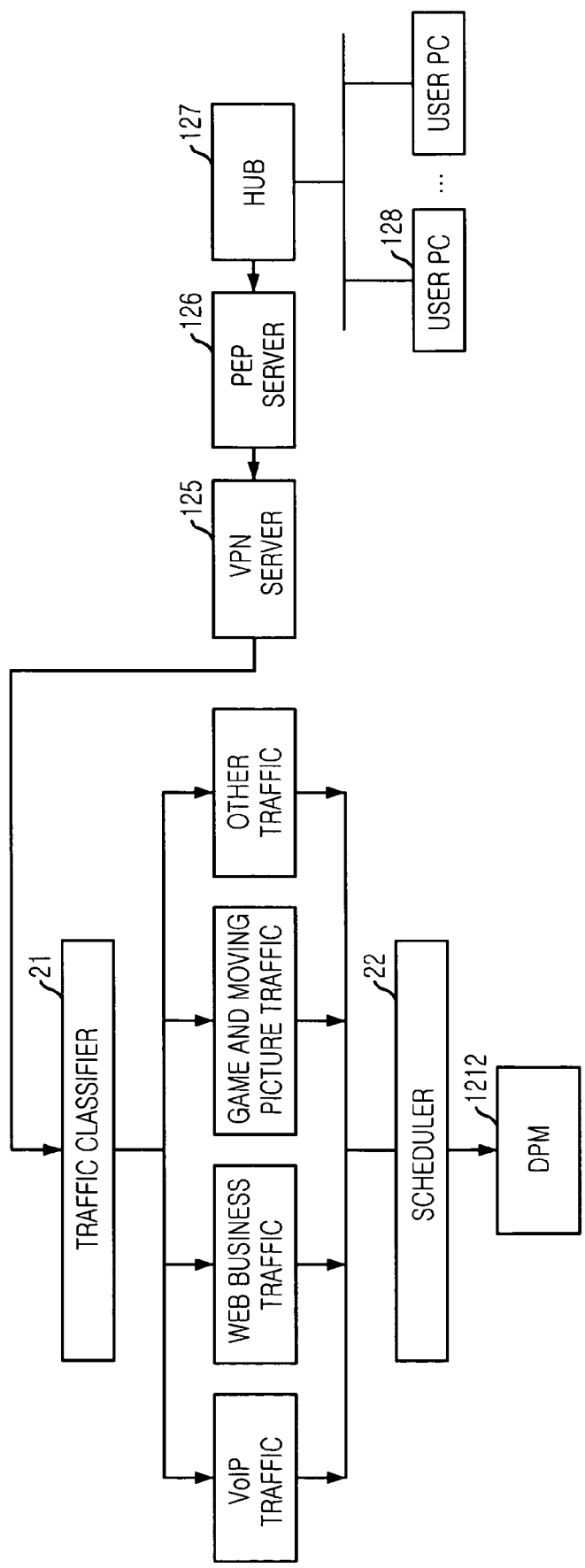
FIG. 3 is a block diagram of an SMT to which the traffic classification method of FIG. 2 is applied.

FIG. 3 is a block diagram of the SMT to which the traffic classification method of FIG. 2 is applied.

Referring to FIG. 3, the SMT 12 includes the PEP server 126, the VPN server 125, and the traffic classifier 21.

A user Internet traffic of the user PC 128 is transmitted to the DPM 1212 through the hub 127, the PEP server 126, the VPN server 125, and the traffic classifier 21. The DPM 1212 request the resource allocation to the DRM 1153 and transmits the user Internet traffic to the central station 10 using the allocated resource.

FIG. 4 is a diagram illustrating a traffic security method considering QoS in an SMT in accordance with an embodiment of the present invention.

As illustrated in FIG. 4, the IP packet processing method of the SMT will be described based on the user Internet traffic, the IP packet in the PEP server 126, the IP traffic in the VPN server 125, and the IP traffic in the traffic classifier 21.

The user Internet traffic of the user PC 128 includes the IP header and the IP payload. Also, the IP payload includes the TCP header and the datagram.

The PEP server 126 stores the IP packet received from the user PC 128, analyzes the IP header and the TCP header of the stored TCP header, sends a spoofing ACK to the user PC 128, and inserts a type of service traffic into the TOS field of the IP header (plaintext).

The VPN server 125 receives the IP packet from the PEP server 126 and encrypts only the IP payload of the received IP packet, but not the IP header.

The DPM 21 analyzes the TOS field of the IP header contained in the IP packet encrypted by the VPN server 125, classifies the traffic according to the traffic priority, manages the classified traffic in the separate queues, and requests the resource for the return link channel to the central station 10 according to the priority of the scheduler 22, for example, the priority based on an amount of the IP data stored in the respective queues.

As described above, the process of transmitting/retransmitting the IP packet to be transmitted from the user terminal or web server of the external network, which is connected to the interactive satellite communication system, through the satellite to the central station or the satellite mobile terminal is performed by acting for the web server of the external network or the user terminal, and the type of traffic is previously inserted into the IP header before the IP packet is encrypted in the satellite mobile terminal, thereby improving the traffic performance in consideration of QoS and making it possible to apply the security scheme.

That is, the present invention can request the resource allocation of the return link based on the type of service by classifying the traffic according to the type of service, thereby preventing the TCP performance degradation due to the long RTT and securing the QoS.

The methods in accordance with the embodiments of the present invention can be realized as programs and stored in a computer-readable recording medium that can execute the programs. Examples of the computer-readable recording medium include CD-ROM, RAM, ROM, floppy disks, hard disks, magneto-optical disks and the like.

The present application contains subject matter related to Korean patent application Nos. 2005-0120189 and 2006-0106523, filed with the Korean Intellectual Property Office on Dec. 8, 2005, and Oct. 31, 2006, respectively, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for traffic performance improvement and traffic security considering a quality of service (QoS) of an interactive satellite communication system, comprising the steps of:

a) storing an Internet protocol (IP) packet that is received from a user terminal connected to a satellite mobile terminal of the interactive satellite communication system and is to be transmitted to a central station through a satellite;

b) transmitting acknowledgement for the stored IP packet to the user terminal by acting for the central station, before the stored IP packet is transmitted to the central station;

c) analyzing an IP header and a TCP header of the stored IP packet and inserting only traffic type information, which is previously stored in the TCP header, into the IP header of the stored IP packet before the stored IP packet is encrypted, wherein the traffic type information comprises encrypted IP packet as VoIP traffic, web business traffic, or game/moving picture traffic;

d) encrypting an IP payload except the IP header of the stored IP packet;

e) classifying the encrypted IP packet according to the traffic type information;

f) requesting a resource allocation of a return link with respect to the classified IP packet to the central station according to a traffic type based priority;

g) transmitting the stored IP packet through the satellite to the central station, and retransmitting an unacknowledged IP packet according to a retransmission request of the central station; and h) decoding the encrypted IP payload into plaintext and then transmitting the decoded IP payload.

2. The method as recited in claim 1, wherein the step b) generates a spoofing acknowledgement with respect to the IP packet and transmits the spoofing acknowledgement to the user terminal in order for the user terminal not to perform a congestion control with respect to the IP packet to be transmitted to the central station.

3. A traffic security method considering a quality of service (QoS) in an interactive satellite communication system, comprising the steps of:

a) storing an IP packet that is received from a user terminal and is to be transmitted through a satellite to a central station, the user terminal being connected to a satellite mobile terminal of the interactive satellite communication system;

b) analyzing an IP header and a TCP header of the stored IP packet and inserting only traffic type information, which is previously stored in the TCP header, into the IP header of the stored IP packet before the stored IP packet is encrypted;

c) encrypting an IP payload except the IP header of the stored IP packet;

d) classifying the encrypted IP packet according to the traffic type information, wherein the traffic type information comprises encrypted IP packet as VoIP traffic, web business traffic, or game/moving picture traffic;

e) transmitting acknowledgement for the stored IP packet to the user terminal by acting for the central station, before the stored IP packet is transmitted to the central station;

f) requesting a resource allocation of a return link with respect to the classified IP packet to the central station according to a traffic type based priority, g) transmitting the stored IP packet through the satellite to the central station, and retransmitting an unacknowledged IP packet according to a retransmission request of the central station; and h) decoding the encrypted IP payload into plaintext and then transmitting the decoded IP payload.

4. The traffic security method as recited in claim 3, wherein the step c) encrypts the IP payload by using an IP security protocol (IPsec).

5. An apparatus for traffic performance improvement and traffic security considering a quality of service (QoS) in a satellite mobile terminal of an interactive satellite communication system, comprising:
- a performance enhancement proxy (PEP) server for storing an IP packet received from a user terminal, transmitting acknowledgement for the stored IP packet to the user terminal by acting for a central station, retransmitting an unacknowledged IP packet according to retransmission request of the central station, and analyzing an IP header and a TCP header of the stored IP packet and inserting only a traffic type information, which is previously stored in the TCP header, into the IP header of the stored IP packet before the stored IP packet is encrypted;
- a virtual private network (VPN) server for encrypting an IP payload except the IP header of the IP packet received from the performance enhancement proxy server;
- a traffic classifier for classifying the encrypted IP packet according to the traffic type information wherein the traffic classifier classifiers the encrypted IP packet as VoIP traffic, web business traffic, game/moving picture traffic, or other traffic according to the traffic type information;
- a transmitter for transmitting acknowledgement for the stored IP packet to the user terminal by acting for the central station, before the stored IP packet is transmitted to the central station;
- a receiver for requesting a resource allocation of a return link with respect to the classified IP packet to the central station according to a traffic type based priority;
- a data transmit/receive (TX/RX) module for requesting a resource allocation of a return link with respect to the classified IP packet to the central station; and
- a decoder for decoding the encrypted IP payload into plaintext and for transmitting the decoded IP payload.

6. The apparatus as recited in claim 5, wherein the virtual private network server encrypts the IP payload by using an IP security protocol (IPsec).

* * * * *